(12) United States Patent
Oh et al.

(10) Patent No.: US 11,679,683 B2
(45) Date of Patent: Jun. 20, 2023

(54) METHOD FOR IMPLEMENTING VIRTUAL INTERNAL COMBUSTION ENGINE VIBRATION IN ELECTRIC VEHICLE

(71) Applicants: Hyundai Motor Company, Seoul (KR); Kia Motors Corporation, Seoul (KR)

(72) Inventors: Ji Won Oh, Hwaseong-si (KR); Dong Chul Park, Anyang-si (KR); Jeong Soo Eo, Hwaseong-si (KR); Tae Kun Yun, Anyang-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 363 days.

(21) Appl. No.: 17/180,039

(22) Filed: Feb. 19, 2021

(65) Prior Publication Data
US 2022/0089035 A1 Mar. 24, 2022

(30) Foreign Application Priority Data
Sep. 22, 2020 (KR) .......... 10-2020-0121973

(51) Int. Cl.
*B60L 15/00* (2006.01)
*B60L 15/20* (2006.01)
(52) U.S. Cl.
CPC ......... *B60L 15/20* (2013.01); *B60L 2240/421* (2013.01); *B60L 2240/423* (2013.01); *B60L 2240/461* (2013.01); *B60L 2250/26* (2013.01); *B60L 2270/42* (2013.01)

(58) Field of Classification Search
CPC ............. B60L 15/20; B60L 2240/421; B60L 2240/423; B60L 2240/461; B60L 2240/12; B60L 50/60; B60L 2250/26; B60L 2250/18; B60L 2250/28; B60L 2270/145;
(Continued)

(56) References Cited

U.S. PATENT DOCUMENTS 9,694,746 B2 * 7/2017 Jo ............................ H04R 3/00
10,059,260 B2 * 8/2018 Kim ........................ G10K 15/02
10,766,479 B2 * 9/2020 Galang ................. B60W 10/06
(Continued)

*Primary Examiner* — Phutthiwat Wongwian
*Assistant Examiner* — Sherman D Manley
(74) *Attorney, Agent, or Firm* — Slater Matsil, LLP

(57) ABSTRACT

A method for implementing virtual internal combustion engine vibration in an electric vehicle includes collecting operation variable information for determining a torque instruction and implementing the virtual internal combustion engine vibration, determining a virtual internal combustion engine vibration characteristic based on the collected operation variable information, determining a vibration torque instruction having the determined virtual internal combustion engine vibration characteristic, correcting the vibration torque instruction by correcting the determined virtual internal combustion engine vibration characteristic of the vibration torque instruction and/or a value of the vibration torque instruction, based on a basic motor torque instruction determined by the collected operation variable information and preset backlash occurring area information, determining a final motor torque instruction using the basic motor torque instruction and the corrected vibration torque instruction.

20 Claims, 6 Drawing Sheets

(58) Field of Classification Search
CPC .... B60W 50/00; B60Y 2200/91; Y02T 10/64; Y02T 10/70; Y02T 10/72
See application file for complete search history.

(56) References Cited

U.S. PATENT DOCUMENTS

| | | | |
|---|---|---|---|
| 10,807,600 B2 * | 10/2020 | Jordan, III | B60W 50/14 |
| 2010/0134058 A1 * | 6/2010 | Nagashima | H02P 21/06 |
| | | | 180/65.285 |
| 2014/0233745 A1 * | 8/2014 | Kanehara | G10K 15/02 |
| | | | 381/61 |
| 2016/0144782 A1 * | 5/2016 | Jo | H04R 3/00 |
| | | | 381/86 |
| 2020/0184946 A1 * | 6/2020 | Jung | B60C 5/008 |
| 2021/0053487 A1 * | 2/2021 | Vangelov | B60K 35/00 |
| 2021/0309113 A1 * | 10/2021 | Mazzini | B60L 7/14 |
| 2022/0063494 A1 * | 3/2022 | Duo' | B60L 7/18 |
| 2022/0072960 A1 * | 3/2022 | Oh | B60L 15/08 |
| 2023/0016272 A1 * | 1/2023 | Kim | B60W 40/09 |

* cited by examiner

METHOD FOR IMPLEMENTING VIRTUAL INTERNAL COMBUSTION ENGINE VIBRATION IN ELECTRIC VEHICLE

CROSS-REFERENCE TO RELATED APPLICATIONS

This application claims the benefit of Korean Patent Application No. 10-2020-0121973, filed on Sep. 22, 2020, which application is hereby incorporated herein by reference.

TECHNICAL FIELD

The present disclosure relates to a method for implementing virtual internal combustion engine vibration in an electric vehicle.

BACKGROUND

As is well known, an electric vehicle (EV) is a vehicle traveling using a motor. A driving system of the electric vehicle includes a battery configured to supply power for driving a motor, an inverter connected to the battery and configured to drive and control the motor, the motor connected to the battery to be chargeable and dischargeable through the inverter as a vehicle driving source, and a reducer configured to reduce and transfer the rotating force of the motor to a drive wheel.

Here, the inverter serves to convert a direct current (DC) supplied by the battery into an alternating current (AC) to apply the alternating current to the motor through a power cable when the motor is driven, and to convert the alternating current generated by the motor into the direct current and then supply the direct current to the battery such that the battery is charged when the motor is regenerated.

A general electric vehicle does not use a multi-stage transmission unlike the conventional internal combustion engine vehicle, and instead, disposes a reducer using a fixed gear ratio between a motor and a drive wheel. This is because unlike the internal combustion engine (ICE) that may provide a high torque only in a region having a wide distribution range of energy efficiency and a high speed according to an operating point, the motor has a relatively small difference inefficiency between the operating points and may implement a high torque at a low speed only with the characteristic of the single motor.

Further, the vehicle mounted with the conventional driving system for the internal combustion engine needs an oscillation mechanism such as a torque converter or a clutch because of the characteristic of the internal combustion engine which may not be driven at a low speed, but as the driving system for the electric vehicle has the characteristic in which the motor is easily driven at a low speed, the oscillation mechanism may be omitted. Due to the mechanical difference, the electric vehicle may have no interruption in the operability caused by the shift and provide soft operability unlike the internal combustion engine vehicle.

Further, a major vibration source in the vehicle mounted with the conventional driving system for the internal combustion engine is an engine (internal combustion engine). The vibration generated by a periodic explosion force of the engine in a start on situation is transferred to a vehicle body and a passenger through a driving system, a mount, or the like. The vibration is often regarded as a negative factor required to be damped. In this respect, the electric vehicle in which the engine is replaced with the motor has no vibration source, such that it is advantageous compared to the internal combustion engine vehicle in view of the improvement in the riding comfort.

However, the absence of the vibration transferred from the engine may make a driver who seeks fun-to-drive feeling feel bored. Particularly, in an electric vehicle having the characteristic which aims for high performance, there are cases where it is necessary to provide a harsh and trembling sensibility, not just a soft feeling. However, the electric vehicle does not sufficiently provide the emotional factor to the driver in the conventional motor control method.

Meanwhile, the general electric vehicle has large difficulty in implementing the virtual internal combustion engine (engine) vibration, which is the impact of the backlash generated by the reducer of the driving system or the like. When a torque is generated by the motor, the torque direction is required to be switched between driving and regeneration, and if a gear is moved from one direction to another direction due to the tolerance between the engaged gears, a hit occurs between the teeth of the gear. When the phenomenon occurs periodically, particularly, in conjunction with a resonance cycle, as the degree of fatigue accumulates, the driving system may be momentarily broken.

Therefore, there is a need for a control technology capable of virtually producing the internal combustion engine (engine) vibration as in the internal combustion engine vehicle while solving the problem of the backlash of the driving system.

The above information disclosed in this background section is only for enhancement of understanding of the background of the disclosure and accordingly it may contain information that does not form the prior art that is already known to a person of ordinary skill in the art.

SUMMARY

The present disclosure relates to a method for implementing virtual internal combustion engine vibration in an electric vehicle. Particular embodiments relate to a method capable of virtually producing internal combustion engine (engine) vibration as in an internal combustion engine vehicle while solving a driving system backlash problem in an electric vehicle.

An embodiment of the present disclosure provides a method capable of virtually producing internal combustion engine (engine) vibration as in an internal combustion engine vehicle in an electric vehicle.

Further, another embodiment of the present disclosure prevents the generation and impact of the backlash of a driving system when the virtual internal combustion engine vibration is implemented in an electric vehicle, thereby securing the durability of the driving system.

The embodiments of the present disclosure are not limited to the aforementioned embodiments, and other embodiments not mentioned may be clearly understood to those skilled in the art to which the present disclosure pertains (hereinafter, referred to as 'those skilled in the art') from the following description.

An exemplary embodiment of the present disclosure provides a method for implementing virtual internal combustion engine vibration in an electric vehicle including collecting, by a control unit, operation variable information for determining a torque instruction and implementing virtual internal combustion engine vibration while an electric vehicle travels, determining, by the control unit, a virtual internal combustion engine vibration characteristic based on the collected operation variable information, determining, by the control unit, a vibration torque instruction having the determined virtual internal combustion engine vibration characteristic, correcting, by the control unit, one or two of the vibration characteristics of the vibration torque instruction and a value of the vibration torque instruction, based on a basic motor torque instruction determined by the operation variable information and a preset backlash occurring area information, determining, by the control unit, a final motor torque instruction using the basic motor torque instruction and the corrected vibration torque instruction, and controlling an operation of a vehicle driving motor according to the determined final motor torque instruction.

As a result, the method for implementing the virtual internal combustion engine vibration in the electric vehicle according to embodiments of the present disclosure may virtually and realistically produce the internal combustion engine (engine) vibration as in the internal combustion engine vehicle in the electric vehicle, thereby providing the different operating sensitivity to the driver. Further, it is possible to prevent the generation and impact of the backlash of the driving system when the virtual internal combustion engine vibration is implemented in the electric vehicle, thereby securing the durability of the driving system.

It is understood that the term "automotive" or "vehicle" or "vehicular" or other similar term as used herein is inclusive of motor vehicles in general such as passenger automobiles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain exemplary examples thereof illustrated in the accompanying drawings which are given hereinbelow by way of illustration only, and thus are not limitative of the present disclosure, and wherein.

Figure 1:
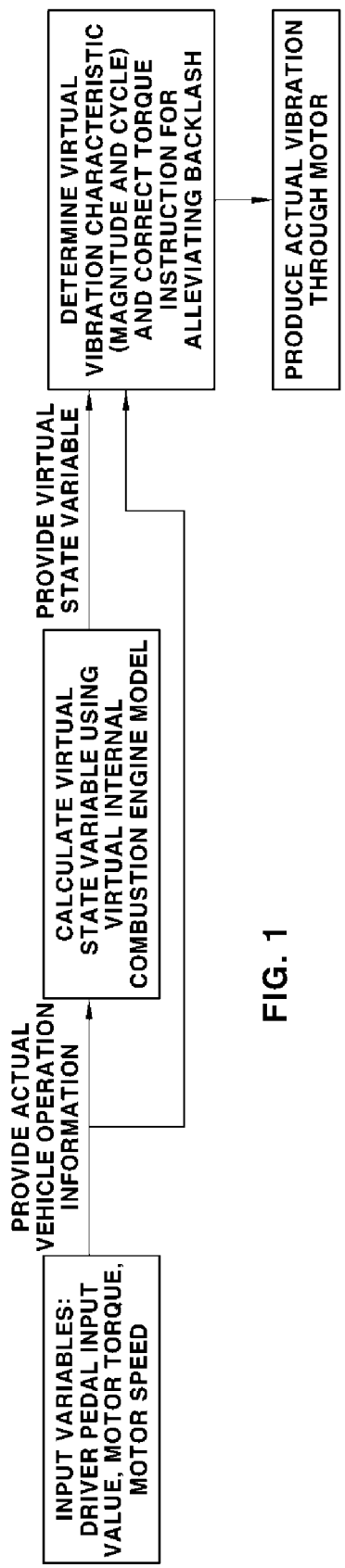
FIG. 1 is a block diagram illustrating a method for implementing virtual engine vibration using a virtual engine model according to embodiments of the present disclosure.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in section by the particular intended application and use environment.

In the figures, reference numbers refer to the same or equivalent sections of embodiments of the present disclosure throughout the several figures of the drawing.

DETAILED DESCRIPTION OF ILLUSTRATIVE EMBODIMENTS

Specific structural to functional descriptions disclosed in the exemplary embodiments of the disclosure are only illustrated for the purpose of describing the exemplary embodiments according to the concept of the present disclosure, and the exemplary embodiments according to the concept of the present disclosure may be embodied in various forms. Further, it should not be construed that the present disclosure is limited to the exemplary embodiments described in the present specification, and it should be understood that the present disclosure includes all changes, equivalents, or substitutions included in the spirit or technical scope of the present disclosure.

Meanwhile, terms such as first and/or second in the present disclosure may be used to describe various components, but the components should not be limited to the terms. The terms are used only for the purpose of distinguishing one component from another component, and for example, without departing from the scope according to the concept of the present disclosure, the first component may be named a second component, and similarly, the second component may also be named the first component.

When a component is referred to as being "connected" or "coupled" to another component, the component may be directly connected or coupled to another component, but it should be understood that other components may also be present between the components. On the other hand, when a component is referred to as being "directly connected" or "directly coupled" to another component, it should be understood that there are no other components between the components. Other expressions which describe the relationship between the components, that is, "between" and "immediately between" or "neighboring" and "directly neighboring" should be interpreted in the same manner.

Throughout the entire specification, the same reference numerals represent the same components. Meanwhile, terms used in the present specification are for describing the exemplary embodiments and do not limit the present disclosure. In the present specification, the singular forms also include the plural forms unless the context specially mentions. The terms "comprises" and/or "comprising" used in the specification mean that the mentioned components, steps, operations, and/or elements do not preclude the presence or addition of one or more other components, steps, operations, and/or elements.

Hereinafter, exemplary embodiments of the present disclosure will be described in detail with reference to the accompanying drawings.

Embodiments of the present disclosure relate to a method capable of realistically producing virtual internal combustion engine (engine) vibration using a driving motor in an electric vehicle. Particular embodiments relate to a method capable of preventing the generation and impact of the backlash in a driving system even while implementing the virtual internal combustion engine vibration.

To this end, embodiments of the present disclosure generate a torque for simulating the vibration characteristic in an internal combustion engine vehicle through the driving motor in an electric vehicle having no internal combustion engine (engine), thereby implementing the virtual internal combustion engine vibration, and at the same time, adjust the amplitude (magnitude) and value of a vibration torque instruction, thereby alleviating the impact of the backlash.

FIG. 1 illustrates the principle and method for implementing internal combustion engine (engine) vibration using a virtual engine model according to embodiments of the present disclosure. In the following description, a motor used for implementing the virtual internal combustion engine vibration is a driving motor connected to a drive wheel to drive a vehicle. Further, those skilled in the art will be able to understand that the internal combustion engine and the engine are used as having the same meaning in the following description.

Embodiments of the present disclosure may collect actual operation variable information in the electric vehicle for implementing the virtual internal combustion engine vibration in real time while the vehicle travels, and determine a vibration torque instruction having the virtual vibration characteristic in the internal combustion engine vehicle based on the actual operation variable information. Alternatively, embodiments of the present disclosure may determine virtual state variable information in a virtual internal combustion engine (engine) model based on the collected actual operation variable information, and then determine the vibration torque instruction having the vibration characteristic in the internal combustion engine vehicle to be implemented by the determined virtual state variable information. Alternatively, embodiments of the present disclosure may determine the vibration torque instruction using both the actual operation variable information and the virtual state variable information.

Here, the operation variable information is information about an actual system owned by the electric vehicle, and may be real-time vehicle operation information in the electric vehicle. Further, the vehicle operation information may include driver input information and operation state information in the actual electric vehicle.

The vehicle operation information may be sensor detection information detected by a sensor and input through a vehicle network, information determined by a control unit itself according to embodiments of the present disclosure, or information input to the control unit according to embodiments of the present disclosure from another control unit within the vehicle through the vehicle network.

Specifically, the driver input information of the operation variable information may be a driver pedal input value, and the driver pedal input value may be an accelerator pedal input value (APS value) and a brake pedal input value (BPS value). Here, the accelerator pedal input value is generated by an acceleration pedal operation of the driver, and as described later, may be information detected by an accelerator pedal detecting unit (APS). Further, the brake pedal input value is generated by a brake pedal operation of the driver, and as described later, may be information detected by a brake pedal detecting unit (BPS).

The operation state information of the operation variable information may include a motor torque and a driving system speed. Here, the motor torque may be a motor torque instruction determined by the control unit based on the vehicle operation information collected by the vehicle. More specifically, as described later, the motor torque may be a basic motor torque instruction determined and generated by a basic torque instruction generating unit (reference numeral '21' in FIG. 2).

The basic motor torque instruction may be determined by the operation variable information, and detailed descriptions of a method and a process for determining and generating the basic motor torque instruction for controlling a torque output of the driving motor in the electric vehicle will be omitted because they are known technical contents in the art.

The driving system speed may include the motor speed, and the motor speed is an actual motor speed measured by a speed detecting unit. Here, as described later, the speed detecting unit may be a resolver installed on the driving motor. Further, the driving system speed may include a wheel speed of the drive wheel, and at this time, the speed detecting unit may be a wheel speed sensor installed on the drive wheel. Further, the driving system speed may also include a drive shaft speed. As described above, the driving system speed according to embodiments of the present disclosure may be defined as a rotating speed at any location of the vehicle driving system including a motor, a reducer, a drive shaft, and a drive wheel.

Further, according to an exemplary embodiment of the present disclosure, the vibration torque instruction may be determined by a function of the actual operation variable, the vibration torque instruction may be determined by a function of the virtual state variable in the internal combustion engine determined by a value of the actual operation variable, or the vibration torque instruction may also be determined by the functions of the actual operation variable and the virtual state variable.

According to an exemplary embodiment of the present disclosure, a preset virtual internal combustion engine model may be used to acquire a virtual state variable value in the internal combustion engine from the value of the actual operation variable in the electric vehicle.

According to an exemplary embodiment of the present disclosure, the virtual engine speed becomes an input speed of a virtual transmission if the virtual internal combustion engine model including a virtual engine and the virtual transmission is to be used. The virtual engine speed may be calculated by a variable multiple value of the actual driving system speed detected by the speed detecting unit, where the driving system speed may be the motor speed. At this time, to calculate the virtual engine speed, a value of the coefficient multiplied by the motor speed may be a value determined by the virtual transmission, a gear ratio model, and a virtual current shift stage.

A control method for generating the virtual shift sense of the electric vehicle is known to generate and implement a multi-stage shift sense through the torque control of the driving motor in the electric vehicle having no multi-stage transmission. Further, the virtual engine speed is known as being used as one of the virtual state variables necessary for generating and implementing the multi-stage shift sense in the control process for generating the virtual shift sense in the electric vehicle.

As described above, the virtual engine speed, which is one of the virtual state variables used for generating and implementing the multi-stage shift sense, may be used as the virtual state variable for implementing the virtual internal combustion engine vibration according to embodiments of the present disclosure. According to an exemplary embodiment of the present disclosure, a virtual vibration control unit may determine the virtual engine speed using a virtual vehicle speed and gear ratio information of the virtual current shift stage.

Here, the virtual vehicle speed may be calculated as a value directly proportional to the actual motor speed using the actual motor speed, which is one of the actual operation variables and a virtual final reduction gear ratio, where the virtual final reduction gear ratio is a preset value in the virtual vibration control unit. According to an exemplary embodiment of the present disclosure, the virtual vehicle speed may be calculated using the actual motor speed measured while the vehicle travels and the virtual final reduction gear ratio, and the virtual engine speed may be calculated by the virtual vehicle speed in real time.

At this time, the virtual engine speed may be obtained by a value obtained by multiplying the virtual vehicle speed by the virtual gear ratio of the virtual current shift stage, or the virtual engine speed may also be obtained by a value obtained by multiplying the driving system speed such as the motor speed by the virtual gear ratio of the virtual current shift stage.

Further, the virtual current shift stage may be determined according to a preset shift schedule map in the virtual vibration control unit from the virtual vehicle speed and the accelerator pedal input value (APS value). As described above, when the virtual current shift stage is determined, the virtual engine speed may be calculated in real time using the virtual gear ratio corresponding to the shift stage, the virtual vehicle speed, or the motor speed.

As described above, the virtual state variable determined using the operation variable as an input in the virtual internal combustion engine (engine) model is used to determine the vibration torque instruction alone or together with the operation variable, and in generating the vibration torque instruction, a final vibration torque instruction for alleviating the backlash is determined by processes such as vibration magnitude correction and offset correction to be described later after the virtual vibration characteristic is determined. Here, the virtual vibration characteristic may include a vibration frequency and a vibration magnitude (amplitude).

Next, after summing the vibration torque instruction determined as described above and an original motor torque instruction, a torque is generated by the motor by controlling an operation of the motor according to the summed final motor torque instruction. As a result, therefore, the virtual vibration such as the actual internal combustion engine vibration may be produced. At this time, the amplitude and value of a vibration torque component are corrected at the timing point when the impact of the backlash is expected such that the impact of the backlash does not occur. That is, as described later, the vibration magnitude correction correcting the magnitude of the vibration torque component and the vibration offset correction offsetting and correcting the value of the vibration torque component may be performed.

According to an exemplary embodiment of the present disclosure, the vibration torque instruction becomes a correction torque instruction used for preventing the backlash and implementing the virtual internal combustion engine vibration. Further, the original motor torque instruction is an instruction corresponding to the driver request torque determined according to the operation input value of the driver, that is, the basic motor torque instruction, and becomes the motor torque instruction before the correction. Further, according to embodiments of the present disclosure, the correction of the original motor torque instruction may mean the sum of the original motor torque instruction and the vibration torque instruction. At this time, the summed final motor torque instruction becomes the motor torque instruction after the correction.

Hereinafter, a method for implementing the virtual vibration according to an exemplary embodiment of the present disclosure will be described in more detail with reference to the following drawings.

Figure 2:
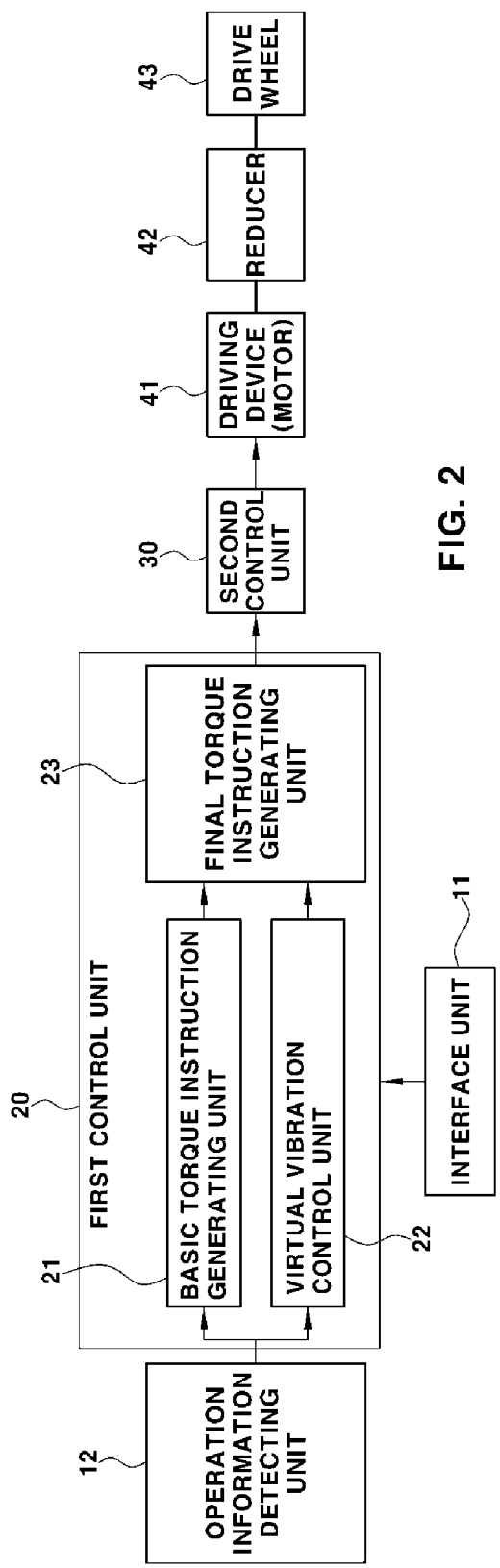
FIG. 2 is a block diagram illustrating a configuration of an apparatus for performing a process of implementing the virtual engine vibration according to an exemplary embodiment of the present disclosure.
Figure 3:
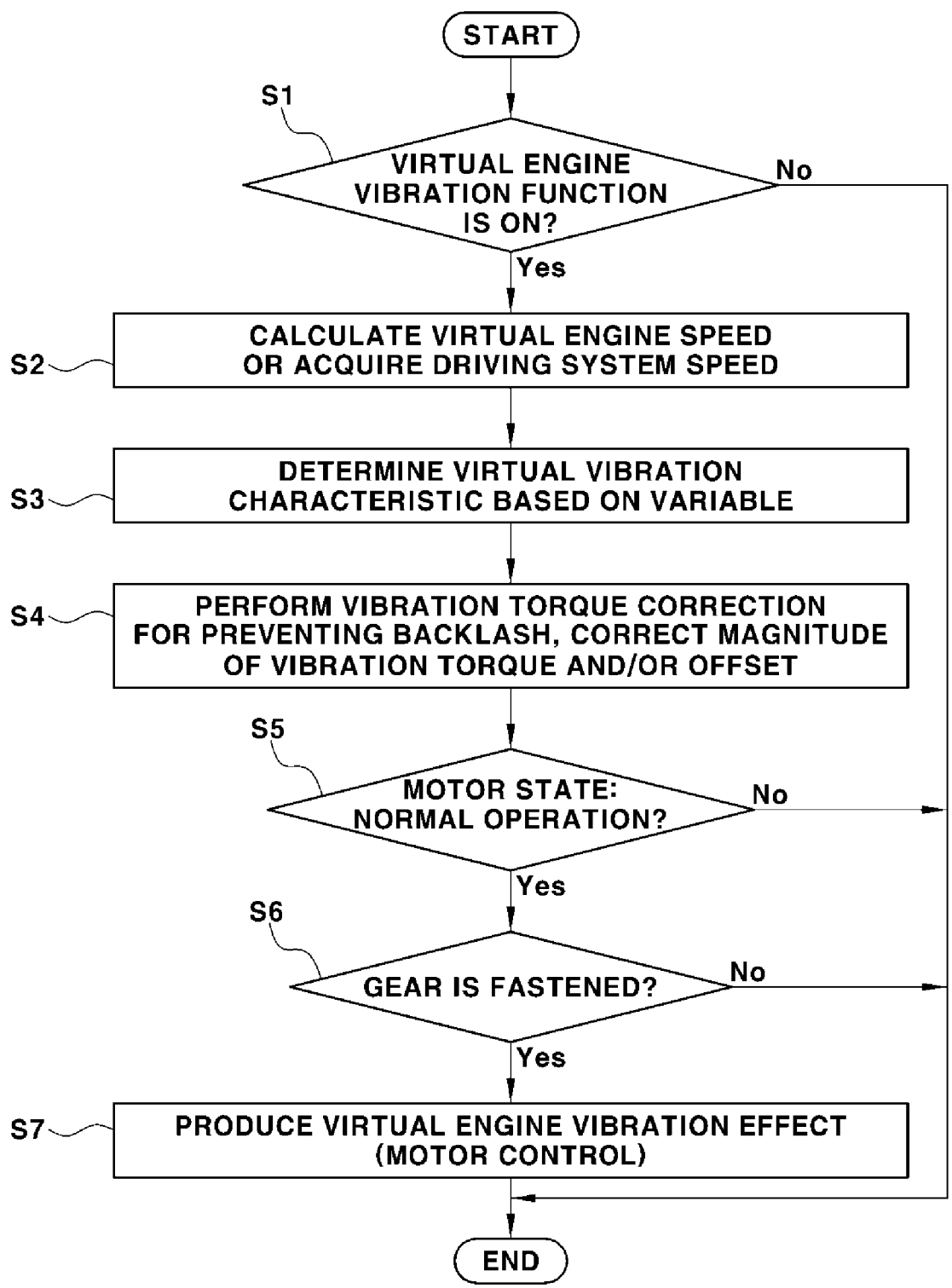
FIG. 3 is a flowchart illustrating a process of implementing the virtual engine vibration according to an exemplary embodiment of the present disclosure.

FIG. 2 is a block diagram illustrating a configuration of an apparatus for performing a process of implementing the virtual internal combustion engine (engine) vibration according to an exemplary embodiment of the present disclosure, and FIG. 3 is a flowchart illustrating the process of implementing the virtual internal combustion engine vibration according to an exemplary embodiment of the present disclosure.

As illustrated in FIG. 2, an apparatus for performing the process of implementing the virtual internal combustion engine vibration according to an exemplary embodiment of the present disclosure is configured to include an operation information detecting unit 12 configured to detect the vehicle operation information (operation variable information), a first control unit 20 configured to generate and output the torque instruction based on the vehicle operation information detected by the operation information detecting unit 12, and a second control unit 30 configured to control an operation of a driving device 41 according to the torque instruction output by the first control unit 20.

Further, the apparatus for performing the process of implementing the virtual internal combustion engine vibration according to embodiments of the present disclosure may further include an interface unit 11 provided such that the driver may selectively input one of ON and OFF of a virtual internal combustion engine vibration implementation function.

While the following description is made by classifying the control subject into the first control unit 20 and the second control unit 30, a control process and a traveling control process for implementing the virtual internal combustion engine vibration of a vehicle according to embodiments of the present disclosure may also be performed by one integrated control element instead of a plurality of control units.

The plurality of control units and the one integrated control element may be collectively referred to as a control unit, and the control process for implementing the virtual internal combustion engine vibration according to embodiments of the present disclosure to be described below may be performed by the control unit. For example, the control unit may collectively refer to both the first control unit 20 and the second control unit 30 in the configuration of the exemplary embodiments to be described later.

The interface unit 11 is available as long as it is a means by which the driver may operate the ON and OFF of the virtual internal combustion engine vibration implementation function in the vehicle. As an example, the interface unit 11 may be an input device of an audio, video, navigation (ANV) system, a touch screen, or the like in addition to an operation device such as a button or a switch provided in the vehicle.

The interface unit 11 may be connected to the first control unit 20, and more specifically, the first control unit 20 may also be connected to a virtual vibration control unit 22 to be described later. Therefore, when the driver performs the ON or OFF operation through the interface unit 11, an ON signal or an OFF signal may be input to the virtual vibration control unit 22 of the first control unit 20 from the interface unit 11. As a result, the virtual vibration control unit 22 of the first control unit 20 may recognize the ON or OFF operation state of the virtual internal combustion engine vibration implementation function by the driver (see step S1 in FIG. 3).

According to embodiments of the present disclosure, the virtual internal combustion engine vibration implementation function while the vehicle travels is executed only in a case where the driver inputs ON through the interface unit 11. Further, when the interface unit 11 is a vehicle input device provided within the vehicle, as another example of the interface unit 11, the driver may also perform the ON and OFF operation of the virtual internal combustion engine vibration implementation function through a mobile device. The mobile device is required to be communicatively connected to an in-vehicle device, for example, the first control unit 20, and to this end, an input/output communication interface for the communication connection between the mobile device and the first control unit 20 is used.

The operation information detecting unit 12 is a configuration unit configured to detect the vehicle operation information (operation variable information) necessary for performing the virtual internal combustion engine vibration implementation function together with the vehicle operation information (operation variable information) necessary for generating the basic motor torque instruction in the vehicle. According to an exemplary embodiment of the present disclosure, the operation information detecting unit 12 may include an accelerator pedal detecting unit configured to detect accelerator pedal input information (accelerator pedal input value) according to an accelerator pedal operation of the driver, a brake pedal detecting unit configured to detect brake pedal input information (brake pedal input value) according to a brake pedal operation of the driver, and a speed detecting unit configured to detect the speed of a vehicle driving system.

Here, the accelerator pedal detecting unit may be a general accelerator position sensor (APS) installed on an accelerator pedal to output an electric signal according to the acceleration pedal operating state of the driver. The brake pedal detecting unit may be a general brake pedal sensor (BPS) installed on the brake pedal to output an electric signal according to the brake pedal operating state of the driver.

The speed detecting unit acquires speed information of the vehicle driving system, where the speed information of the vehicle driving system may include the motor speed, that is, the rotating speed of the driving motor 41. At this time, the speed detecting unit may be a resolver installed on the driving motor 41. Alternatively, the speed information of the vehicle driving system may include the rotating speed of the drive wheel 43 (drive wheel speed), and at this time, the speed detecting unit may be a wheel speed sensor installed on the drive wheel 43. Alternatively, the speed information of the vehicle driving system may include the rotating speed of a driveshaft (drive shaft speed), and at this time, the speed detecting unit may be a sensor capable of detecting the rotating speed of the drive shaft.

Further, the first control unit 20 includes the basic torque instruction generating unit 21 configured to determine and generate the basic motor torque instruction from the vehicle operation information, the virtual vibration control unit 22 configured to determine and generate the correction torque instruction (i.e., vibration torque instruction) for generating and implementing the motor vibration for implementing the virtual internal combustion engine vibration using one or two of the actual operation variable and the virtual state variable, and a final torque instruction generating unit 23 configured to generate a final motor torque instruction corrected by correcting the basic motor torque instruction into a correction torque instruction.

The basic motor torque instruction is the motor torque instruction determined and generated based on the vehicle operation information collected during traveling in a general electric vehicle, and the basic torque instruction generating unit 21 may be a vehicle control unit (VCU) configured to generate the motor torque instruction based on the vehicle operation information in the general electric vehicle or a part thereof.

Further, the virtual vibration control unit 22 is a new configuration unit configured to determine, generate, and output the vibration torque instruction, which is the correction torque instruction only for implementing the virtual internal combustion engine vibration separately from the basic motor torque instruction according to embodiments of the present disclosure, and may be added as a part of the vehicle control unit within the vehicle control unit or provided as a control element separately from the vehicle control unit.

According to an exemplary embodiment of the present disclosure, the virtual vibration control unit 22 is a control element configured to perform the overall control for implementing the virtual internal combustion engine vibration, and acquires the virtual state variable information in the internal combustion engine (virtual internal combustion engine model) based on the actual operation variable while acquiring the actual operation variable (driving system speed or the like) in the electric vehicle (see step S2 in FIG. 3).

Further, the virtual vibration control unit 22 determines the virtual vibration characteristic using one or two of the actual operation variable and the virtual state variable (see step S3 in FIG. 3), and determines and generates the final correction torque instruction (vibration torque instruction) for implementing the virtual internal combustion engine vibration and alleviating the backlash from the determined virtual vibration characteristic information (see step S4 in FIG. 3).

The basic motor torque instruction input from the basic torque instruction generating unit 21 is corrected by the correction torque instruction input from the virtual vibration control unit 22, and the final torque instruction generating unit 23 may calculate the final motor torque instruction by summing the basic motor torque instruction and the vibration torque instruction which is the correction torque instruction.

The second control unit 30 is a control unit configured to receive the torque instruction transmitted by the first control unit 20, that is, the final motor torque instruction determined by the final torque instruction generating unit 23 of the first control unit 20 to control the operation of the driving device 41. Here, the driving device 41 is the driving motor 41 connected to the drive wheel 43 to drive the vehicle. At this time, the second control unit 30 may be a known motor control unit (MCU) configured to drive the driving motor 41 through an inverter in the general electric vehicle and to control the driving of the driving motor 41.

According to an exemplary embodiment of the present disclosure, the vibration torque instruction for implementing the virtual internal combustion engine vibration imparts the virtual internal combustion engine vibration to the torque of the motor which is the driving device 41, and produces very little trembling of the motor torque matching with the virtual vibration characteristic. The vibration torque instruction may have an instruction value fluctuated in the wave form of a predetermined frequency (or cycle) and amplitude (vibration magnitude). That is, the vibration torque instruction may have an instruction value interlocking with the virtual vibration characteristic, and for example, have an instruction value corresponding to the vibration frequency (or cycle) and the amplitude (vibration magnitude) among the virtual vibration characteristics.

According to an exemplary embodiment of the present disclosure, as illustrated in FIG. 2, the torque and rotating force output by the motor, which is the driving device 41, is reduced by the reducer 42 and then transferred to the drive wheel 43, and when the driving of the motor 41 is controlled according to the final motor torque instruction corrected by the vibration torque instruction, the motor torque to which the virtual internal combustion engine vibration is added is output.

FIG. 3 illustrates that when the vibration torque instruction is corrected and the final motor torque instruction is determined by correcting the basic motor torque instruction according to the corrected vibration torque instruction in step S4, whether the motor state is a normal operating state is confirmed in step S5, a gear fastening state is confirmed in step S6, and then the driving of the motor 41 according to the final motor torque instruction is controlled in step S7, thereby producing the vibration effect.

Meanwhile, as described above, the virtual vibration control unit 22 of the first control unit 20 may determine the virtual vibration characteristic using the actual operation variable and the virtual state variable, and determine the virtual vibration characteristic based on the motor torque and the motor speed, for example, and determines the vibration torque instruction for implementing the virtual internal combustion engine vibration from the determined virtual vibration characteristic. Further, the virtual vibration control unit 22 may correct the vibration torque instruction determined by the virtual vibration characteristic based on the vehicle operation information in order to determine the final vibration torque instruction. According to an exemplary embodiment of the present disclosure, the correction of the vibration torque instruction may be the vibration magnitude correction, the vibration offset correction, or the simultaneous correction of the vibration magnitude and the vibration offset. Here, the vibration magnitude means the amplitude of the vibration torque component, and the vibration offset correction means offsetting and correcting the value of the vibration torque component.

Figure 4:
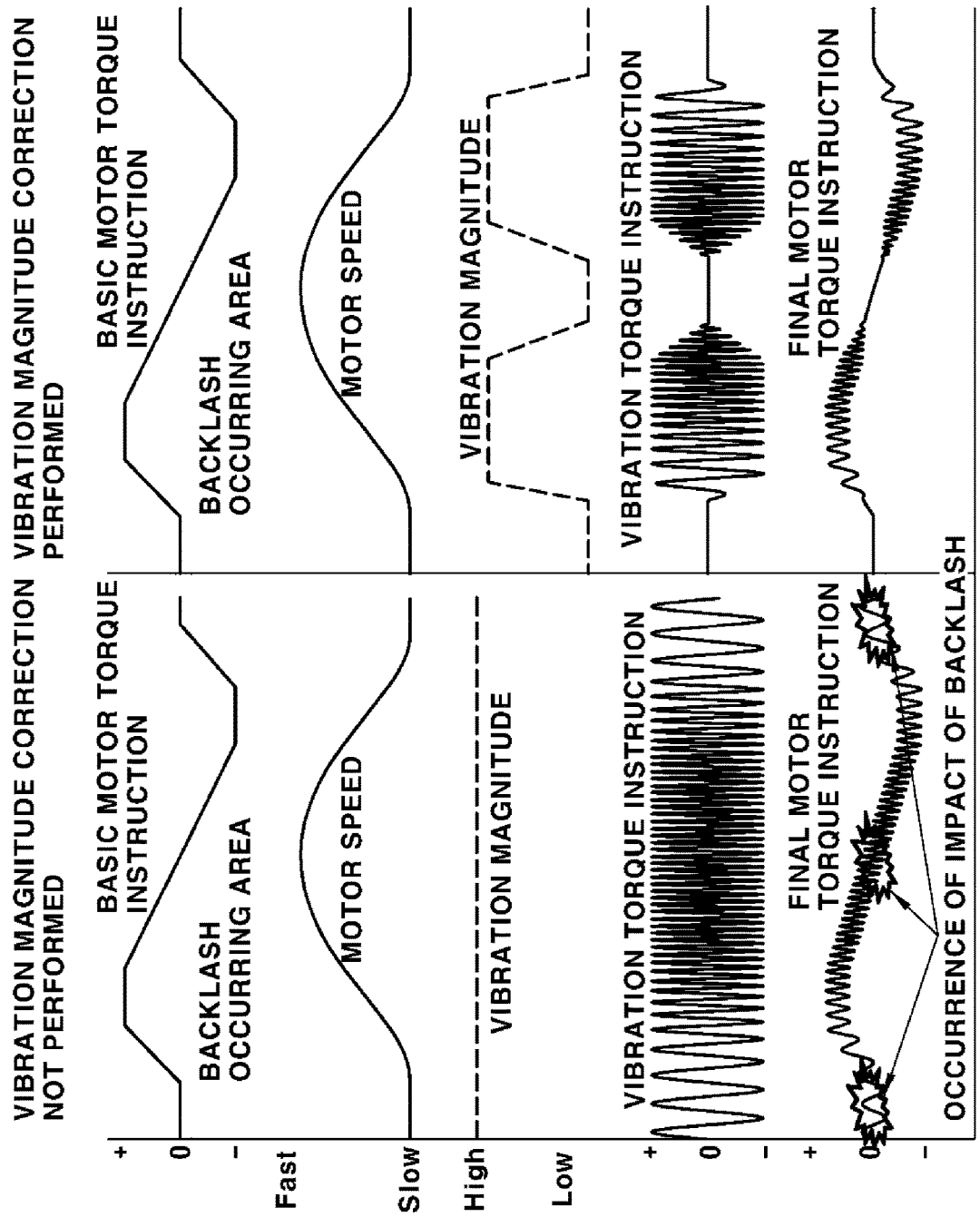
FIG. 4 is a diagram illustrating an example of performing vibration magnitude correction according to an exemplary embodiment of the present disclosure.

FIG. 4 is a diagram for explaining the vibration magnitude correction according to an exemplary embodiment of the present disclosure, and a diagram illustrating an example of correcting the vibration torque instruction based on the motor torque and the motor speed. According to an exemplary embodiment of the present disclosure, the motor torque for determining the virtual vibration characteristic may be the motor torque instruction, and the motor torque instruction may be the basic motor torque instruction determined by the basic torque instruction generating unit 21 in real time.

The impact due to the gear backlash may occur in the driving system including the reducer 42 at the timing point when the direction of the motor torque is switched, and at this time, as illustrated in FIG. 4, a backlash occurring area may be a motor torque area having a zero torque and a determined torque range approximate to the zero torque. According to an exemplary embodiment of the present disclosure, the backlash occurring area is information preset and used in the control unit, and may be set to a torque range which has a determined negative (−) torque value as a minimum value and a determined positive (+) torque value as a maximum value. Further, according to embodiments of the present disclosure, the switching of the direction of the motor torque means that the motor torque is switched from the positive (+) value to the negative (−) value or conversely, the motor torque is switched from the negative value to the positive value. Further, the motor torque having the positive value means a driving torque, and the motor torque having the negative value means a regenerative torque.

Further, the impact due to the gear backlash may occur at the timing point when the direction of the motor torque is switched, and when the vibration torque instruction is applied to implement the virtual internal combustion engine vibration in a state of not considering the problem, a significant impact may be caused, thereby degrading the operability of the vehicle. Therefore, to prevent such a phenomenon, there is a need for a method for preventing the final motor torque instruction from frequently switching the direction due to the virtual internal combustion engine vibration implementation function. To this end, when the basic motor torque instruction exists within the backlash occurring area, a method for adjusting the vibration magnitude (amplitude) of the vibration characteristic values of the vibration torque instruction is applicable.

According to an exemplary embodiment of the present disclosure, the vibration magnitude (amplitude) of the vibration torque instruction before correction determined by the virtual vibration characteristic may be obtained by the driving system speed (may be the motor speed, the wheel speed, the drive shaft speed, or the like), the virtual engine speed, or the basic motor torque instruction. At this time, as the speed value such as the driving system speed and the virtual engine speed increases, the vibration magnitude (amplitude) of the vibration torque instruction before the correction may be determined as a smaller value. Further, as the basic motor torque instruction decreases, the vibration magnitude (amplitude) of the vibration torque instruction before the correction may be determined as a smaller value. Here, the basic motor torque instruction may be replaced with the accelerator pedal input value (APS value) detected by the accelerator pedal detecting unit, and as the accelerator pedal input value decreases, the vibration magnitude (amplitude) of the vibration torque instruction before the correction may be determined as a smaller value.

Alternatively, the vibration magnitude of the torque instruction before the correction may be finally determined as a value obtained by multiplying the vibration magnitude determined as the smaller value as the speed values such as the driving system speed and the virtual engine speed increase by the vibration magnitude determined as the larger value as the basic motor torque instruction and the accelerator pedal input value increase. Alternatively, the vibration magnitude of the vibration torque instruction before the correction may also be determined as a preset setting value (a 'High' value in the left drawing in FIG. 4).

Further, according to an exemplary embodiment of the present disclosure, the vibration frequency (or cycle) of the vibration torque instruction before the correction may be obtained by the driving system speed or the virtual engine speed. At this time, as the driving system speed or the virtual engine speed increases, the vibration frequency may be determined as a larger value.

Further, according to an exemplary embodiment of the present disclosure, as the basic motor torque instruction value is close to the backlash occurring area, the vibration magnitude after the correction for preventing the backlash may be determined as a smaller value. That is, as a difference with the minimum value or the maximum value of the backlash occurring area decreases, the basic motor torque instruction value is corrected such that the vibration magnitude of the vibration torque instruction becomes a smaller value. Further, if the basic motor torque instruction value exists within the backlash occurring area, the vibration magnitude of the vibration torque instruction may be corrected to a value of zero.

The left drawing in FIG. 4 illustrates the state before the magnitude of the vibration torque instruction is corrected, and the right drawing in FIG. 4 illustrates a state where the magnitude of the vibration torque instruction is corrected (i.e., adjusted).

As seen in the right drawing in FIG. 4, when the vibration magnitude before the correction is determined (e.g., the 'High' value in FIG. 4), if the basic motor torque instruction exists within the determined backlash occurring area, the vibration magnitude is decreased to a setting torque value (e.g., the 'Low' value in FIG. 4). Here, the setting torque value may be a value of zero. As a result, when the basic motor torque instruction exists within the backlash occurring area, the vibration torque instruction corrected based on the decreased vibration magnitude may be determined as a value of zero.

Further, as a value of the basic motor torque instruction is close to the backlash occurring area (i.e., as the difference with the minimum value or the maximum value of the backlash occurring area decreases), the vibration magnitude of the vibration torque instruction may be gradually decreased, and then when the basic motor torque instruction is away from the backlash occurring area, the vibration magnitude of the vibration torque instruction may be gradually increased.

As a result, when the vibration torque instruction is determined as described above, the final motor torque instruction may be determined by correcting the basic motor torque instruction using the vibration torque instruction having the corrected vibration magnitude (amplitude). As described above, whether the value of the basic motor torque instruction exists within the backlash occurring area is observed, and the vibration magnitude is decreased in real time based on the observation result such that the final motor torque instruction is not vibrated in the backlash occurring area and the impact of the backlash does not occur.

As described above, a method for correcting the vibration magnitude to prevent the impact of the backlash will be described with a specific example. First, the vibration magnitude (amplitude) of the vibration torque instruction is determined to be the minimum difference value or less between the current value of the basic motor torque instruction and the value within the backlash occurring area. That is, when the final motor torque instruction is indicated by Tcmd, the basic motor torque instruction (being the torque instruction not considering the vibration torque) is indicated by Tbase, and the vibration torque instruction is indicated by Tvib, the Tcmd is obtained by summing the Tbase and the Tvib, where when the torque value of the backlash occurring area closest to (approximate to) the current value of the Tbase is indicated by Tbls*, any value of the values of |Tbase−Tbls*| or less may be determined as the magnitude (amplitude) of the Tvib. At this time, if the magnitude of the Tvib is not clearly defined, a value inferred from the peak value of the past signal may be determined as the magnitude of the Tvib.

As described above, the torque value Tbls* of the backlash occurring area closest to the current value of the Tbase may be one of two boundary values (lower limit value and upper limit value) of the backlash occurring area, and means the torque value of the backlash occurring area in which the difference with the current value of the Tbase is the minimum. That is, when the basic motor torque instruction value is a positive value larger than the backlash occurring area (driving torque instruction value), the value of the Tbls* becomes the maximum value (upper limit value) (Tbls,high) of the torque values of the backlash occurring area. Conversely, when the basic motor torque instruction value is a negative value smaller than the backlash occurring area (regenerative torque instruction value), the value of the Tbls* becomes the minimum value (lower limit value) (Tbls,low) of the torque values of the backlash occurring area.

Hereinafter, the above contents will be explained with a specific numerical value as an example.

Example (1). In a case where the backlash occurring area set in the control unit is the torque area between Tbls, low=−5 newton metres (Nm) and Tbls,high=15 Nm (−5 to 15), when the Tbase is 40 Nm and the Tvib is 20×sin(ωt), the value of the backlash occurring area closest to 40 Nm of the Tbase (positive boundary value) is Tbls*=Tbls,high=15 Nm, such that the result becomes |Tbase−Tbls*|=25 Nm. Therefore, since 20, which is the amplitude of Tvib=20×sin(ωt), does not exceed 25, it is possible to maintain the current Tvib=20×sin(ωt).

Example (2). In a case where the backlash occurring area is the torque area between Tbls,low=−5 Nm and Tbls, high=15 Nm (−5 to 15), when the Tbase is 25 Nm and the Tvib is 40×sin(ωt), the value of the backlash occurring area closest to 25 Nm of the Tbase (positive boundary value) is Tbis*=Tbls,high=15 Nm, such that the result becomes |Tbase−Tbls*|=10 Nm. Therefore, since 40, which is the amplitude of Tvib=40×sin(ωt), exceeds 10, it is impossible to maintain the current Tvib=40×sin(ωt). At this time, the amplitude of the Tvib is adjusted to 10 Nm or less.

Figure 5:
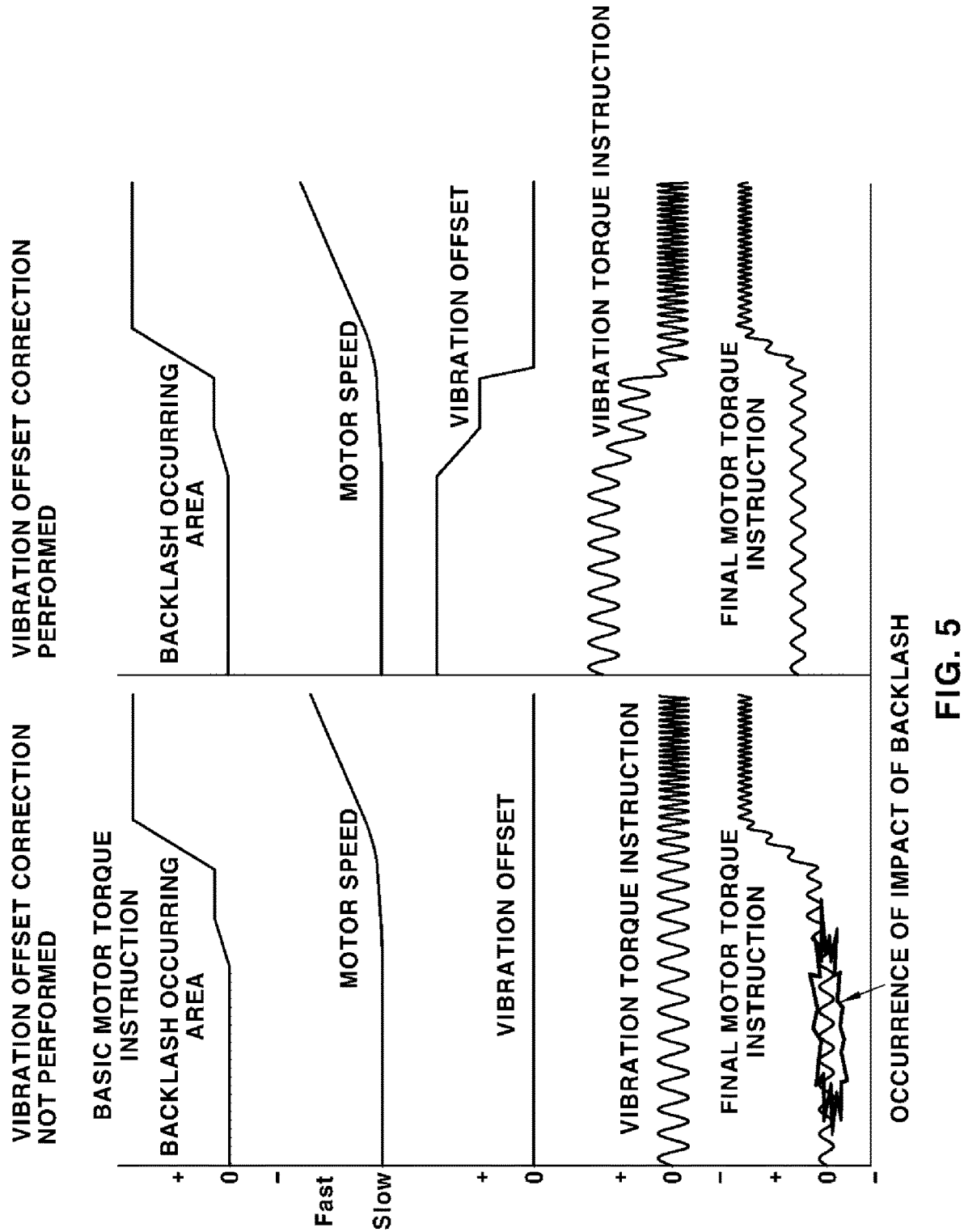
FIG. 5 is a diagram illustrating an example of performing vibration offset correction for preventing the impact of the backlash according to an exemplary embodiment of the present disclosure.

Meanwhile, FIG. 5 is a diagram illustrating an example of performing the vibration offset correction for preventing the impact of the backlash according to an exemplary embodiment of the present disclosure. The left drawing in FIG. 5 illustrates an example of a state before the vibration offset correction is performed, and the right drawing therein illustrates an example of performing the vibration offset correction. FIG. 5 illustrates a comparison of before and after the correction of the vibration torque instruction and the final motor torque instruction values generated by the pre-correction and post-correction, when the motor torque (basic motor torque instruction), the motor speed, which is the driving system speed, and the backlash occurring area are the same.

When the aforementioned vibration magnitude correction method is a method capable of preventing the switching of the torque direction (torque vibration) within the backlash occurring area, the vibration offset correction method illustrated in FIG. 5 is a method for preventing the torque instruction from entering the backlash occurring area at all. However, the method has the advantage of reliably preventing the impact of the backlash but has a limit which may not accurately follow the basic motor torque.

Therefore, the vibration offset correction illustrated in FIG. 5 may be applied to implement the virtual internal combustion engine vibration in a stop state. This is because the accuracy of following the basic motor torque is meaningless when the virtual idle vibration or the like is implemented in the state of applying the brake pedal. However, since the motor is not required to be undesirably accelerated by the offset torque, the vibration offset correction may be applied in the state where the driving system is fastened, that is, the drive gear fastened state rather than the neutral state, or the like.

Specifically explaining the vibration offset correction method, an offset value is imparted to the vibration torque instruction to prevent the final motor torque instruction obtained by summing the basic motor torque instruction and the vibration torque instruction from entering the backlash occurring area.

That is, when the final motor torque instruction Tcmd is obtained by summing the basic motor torque instruction Tbase (torque instruction not considering the vibration torque) and the vibration torque instruction Tvib, if the boundary value (the minimum value or the maximum value) of the backlash occurring area in the direction in which the offset is to be imparted in the current basic motor torque instruction Tbase is Tbls* and the amplitude of the Tvib is A, any value of the values of 'Tbls*−Tbase+(sign(offset))× A' or more (may also be 'Tbls*−Tbase+(sign(offset))×A' or less according to the offset direction) is determined as the offset amplitude of the vibration torque instruction Tvib.

However, when the offset direction to be imparted and the calculated offset direction are opposite to each other, it means that the summed final motor torque instruction Tcmd is already out of the backlash occurring area even in the current state, such that it is unnecessary to impart the offset. Further, if the amplitude A of the vibration torque instruction Tvib is not clearly defined, the amplitude A may be used by being inferred from the peak value of the past signal or the like.

As described above, the direction in which the offset is imparted means one of a driving torque direction and a regenerative torque direction, and if the offset direction is the driving torque direction, it means that the vibration torque instruction is offset to be a positive value larger than the backlash occurring area. Conversely, if the offset direction is the regenerative torque direction, it means that the vibration torque instruction is offset to be a negative value smaller than the backlash occurring area. Further, the 'sign (offset)' becomes+1 if the offset direction is the driving torque direction, and becomes −1 if the offset direction is the regenerative torque direction.

Hereinafter, the above contents will be explained with a specific numerical value as an example.

Example (1). In a case where the backlash occurring area is the torque area between Tbls,low=−5 Nm and Tbls, high=15 Nm (−5 to 15), when the Tbase is −1 Nm and the Tvib is 20×sin(ωt), the result becomes Tbls*=Tbls,low=−5 Nm when the offset is intended to be imparted in the regenerative torque direction, such that any value of the values of Tbls*−Tbase+(−1)×A=−5−(−1)−20=−24 Nm or less is determined as the offset value of the vibration torque.

Example 2) in a case where the backlash occurring area is the torque area between Tbls,low=−5 Nm and Tbls,high=15 Nm (−5 to 15), when the Tbase is 20 Nm and the Tvib is 7×sin(ωt), the result becomes Tbls*=Tbls,high=15 Nm when the offset is intended to be imparted in the driving torque direction, such that any value of the values of Tbls*−Tbase+1×A=15−20+7=2 Nm or more is determined as the offset value of the vibration torque.

As described above, if the offset direction is the driving torque direction, any value which is 'Tbls*−Tbase+(sign (offset))×A' or more is determined as the amplitude of the offset, and if the offset direction is the regenerative torque direction, any value which is 'Tbls*−Tbase+(sign(offset))× A' or less is determined as the amplitude of the offset.

Referring to the left drawing in FIG. 5, when the vibration offset correction is not performed, the vibration offset value is o, such that the value of the vibration torque instruction is not offset, and in this case, the final motor torque instruction is located within the backlash occurring area to cause the impact of the backlash.

Referring to the right drawing in FIG. 5, when the vibration offset correction is performed in the stop state, the vibration offset value is determined, and then the vibration torque instruction is offset by the vibration offset value in the driving torque direction. As a result, the final motor torque instruction obtained by summing the offset-corrected vibration torque instruction and the basic motor torque instruction becomes the state of being out of the backlash occurring area, thereby preventing the occurrence of the impact of the backlash.

Figure 6:
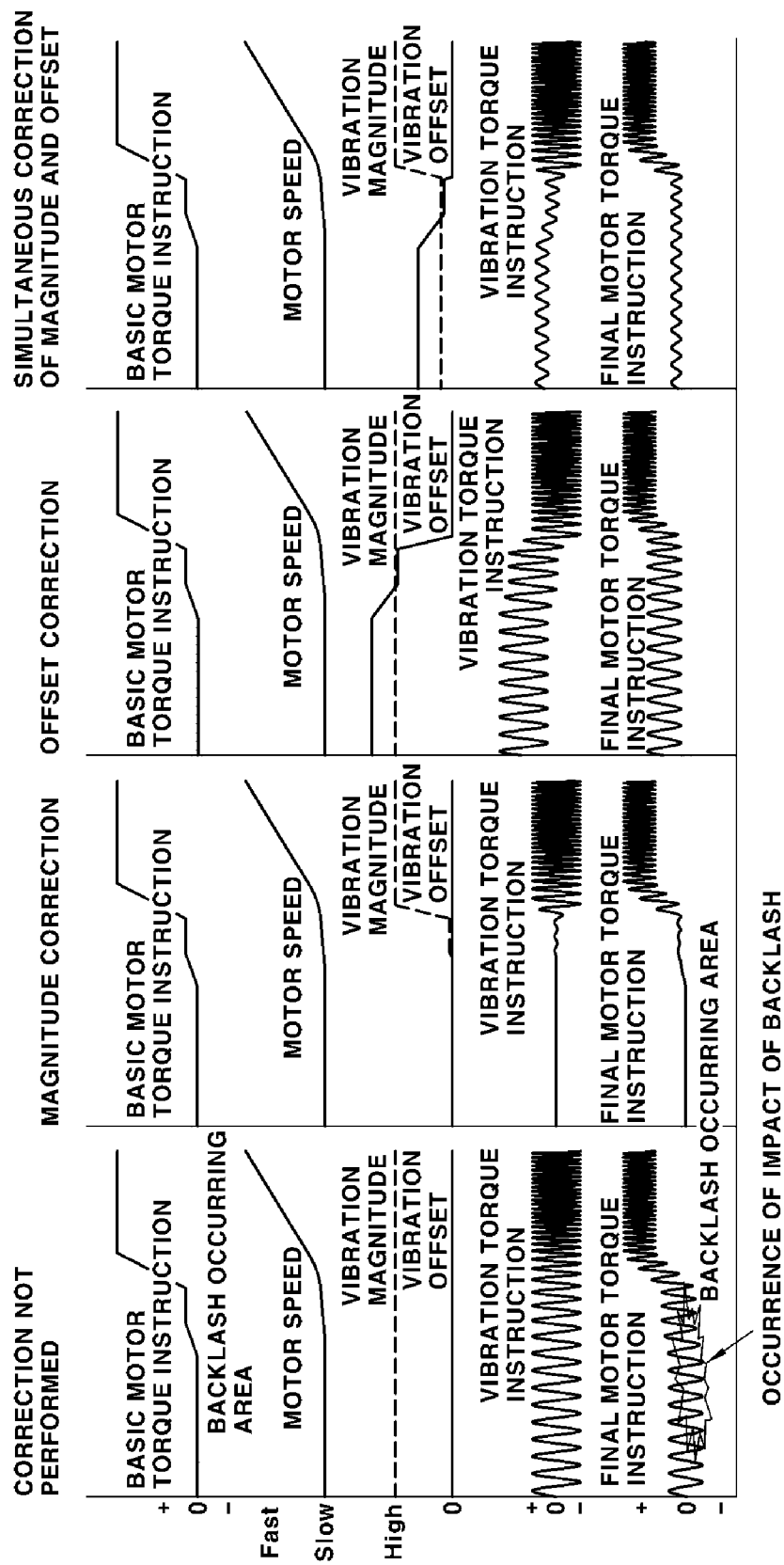
FIG. 6 is a diagram illustrating an example of overlapping and applying the vibration magnitude correction and the vibration offset correction according to an exemplary embodiment of the present disclosure.

Next, a method for simultaneously overlapping and applying the vibration magnitude (amplitude) correction and the vibration offset correction may be applied to prevent the impact of the backlash. FIG. 6 is a diagram illustrating an example of overlapping and applying the vibration magnitude correction and the vibration offset correction according to an exemplary embodiment of the present disclosure. FIG. 6, from left to right, illustrates a case of not performing the correction, a case of performing the vibration magnitude correction, a case of performing the vibration offset correction, and a case of simultaneously performing the vibration magnitude correction and the vibration offset correction.

When the switching of the torque direction within the backlash occurring area is prevented by only the vibration magnitude (amplitude) correction, the impact of the backlash may be eliminated but it is difficult to implement the virtual vibration.

Conversely, when the entry of the torque instruction within the backlash occurring area is prevented by only the vibration offset correction, the impact of the backlash may be eliminated but it is difficult to follow the original basic motor torque instruction.

Therefore, it is possible to implement the virtual vibration by overlapping and applying two methods to apply the partially corrected vibration magnitude (amplitude), and to prevent the switching of the torque direction within the backlash occurring area which may occur at this time through the vibration offset correction. When the overlapping correction is performed, the vibration magnitude (amplitude) is lower than originally intended but it is possible to implement the virtual vibration, and to further enhance the followability for the basic motor torque instruction rather than preventing the impact of the backlash with only the offset correction.

When overlapping and applying the vibration magnitude correction and the vibration offset correction, a correction width of the vibration magnitude is limited such that the whole impact of the backlash is not eliminated by only the vibration magnitude correction. Further, the vibration offset correction is performed using the vibration magnitude information to which the limited correction is applied as the input for the offset correction. The vibration magnitude correction and the vibration offset correction may be complementarily operated by such a method, thereby preventing and minimizing the impact of the backlash.

As described above, while the exemplary embodiments of the present disclosure have been described in detail, the scope of the present disclosure is not limited thereto, and various changed and improved forms by those skilled in the art using the basic concepts of the present disclosure defined by the appended claims are also included in the scope of the present disclosure.

What is claimed is:

1. A method for implementing virtual internal combustion engine vibration in an electric vehicle, the method comprising:
    collecting operation variable information for determining a torque instruction and implementing the virtual internal combustion engine vibration while the electric vehicle travels;
    determining a virtual internal combustion engine vibration characteristic based on the collected operation variable information;
    determining a vibration torque instruction having the determined virtual internal combustion engine vibration characteristic;
    correcting the vibration torque instruction by correcting the determined virtual internal combustion engine vibration characteristic of the vibration torque instruction and/or a value of the vibration torque instruction, based on a basic motor torque instruction determined by the collected operation variable information and a preset backlash occurring area information;
    determining a final motor torque instruction using the basic motor torque instruction and the corrected vibration torque instruction; and
    controlling an operation of a driving motor of the electric vehicle according to the determined final motor torque instruction.

2. The method of claim 1, wherein the virtual internal combustion engine vibration characteristic comprises a vibration frequency and a vibration magnitude (amplitude).

3. The method of claim 1, wherein the collected operation variable information for determining the virtual internal combustion engine vibration characteristic comprises at least one of a driving system speed, an accelerator pedal input value, the basic motor torque instruction, or a virtual engine speed determined by the driving system speed.

4. The method of claim 3, wherein the virtual engine speed is determined as a multiple value of the driving system speed.

5. The method of claim 3, wherein the driving system speed is a motor speed, a wheel speed of a drive wheel, or a drive shaft speed.

6. The method of claim 3, further comprising setting the backlash occurring area to a torque range having a predetermined negative (−) torque value as a minimum value and a predetermined positive (+) torque value as a maximum value.

7. The method of claim 6, wherein determining the virtual internal combustion engine vibration characteristic comprises determining a value of the basic motor torque instruction such that a vibration magnitude (amplitude) of the virtual internal combustion engine vibration characteristic becomes a smaller value as a difference with the minimum value or the maximum value of the backlash occurring area decreases.

8. The method of claim 1, further comprising setting the backlash occurring area to a torque range having a predetermined negative torque value as a minimum value and a predetermined positive torque value as a maximum value.

9. The method of claim 1, wherein correcting the vibration torque instruction by correcting the determined virtual internal combustion engine vibration characteristic of the vibration torque instruction comprises correcting a vibration magnitude of the vibration torque instruction.

10. The method of claim 9, further comprising correcting the vibration magnitude of the vibration torque instruction to a value of zero when the basic motor torque instruction is a value within the backlash occurring area.

11. The method of claim 9, further comprising correcting a value of the basic motor torque instruction such that the vibration magnitude of the vibration torque instruction becomes a smaller value as a difference with a minimum value or a maximum value of the backlash occurring area decreases.

12. The method of claim 9, further comprising, when the basic motor torque instruction is indicated by Tbase, and a minimum value or a maximum value of the backlash occurring area is indicated by Tbls*, correcting the vibration magnitude of the vibration torque instruction to any value of values of |Tbase−Tbls*| or less.

13. The method of claim 1, wherein determining the final motor torque instruction comprises summing the basic motor torque instruction and the corrected vibration torque instruction.

14. A method for implementing virtual internal combustion engine vibration in an electric vehicle, the method comprising:
    collecting operation variable information for determining a torque instruction and implementing the virtual internal combustion engine vibration while the electric vehicle travels;
    determining a virtual internal combustion engine vibration characteristic based on the collected operation variable information;
    determining a vibration torque instruction having the determined virtual internal combustion engine vibration characteristic;
    correcting the vibration torque instruction by correcting a value of the vibration torque instruction, based on a basic motor torque instruction determined by the collected operation variable information and a preset backlash occurring area information;
    determining a final motor torque instruction using the basic motor torque instruction and the corrected vibration torque instruction; and
    controlling an operation of a driving motor of the electric vehicle according to the determined final motor torque instruction,
    wherein correcting the value of the vibration torque instruction performs an offset correction for the value of the vibration torque instruction to prevent the determined final motor torque instruction from entering the backlash occurring area.

15. The method of claim 14, further comprising determining an offset direction as a driving torque direction offsetting the vibration torque instruction to be a positive value larger than the backlash occurring area or as a regenerative torque direction offsetting the vibration torque instruction to be a negative value smaller than the backlash occurring area.

16. The method of claim 15, wherein:
    when the basic motor torque instruction is indicated by Tbase, a vibration magnitude of the vibration torque instruction is indicated by A, and a maximum value or a minimum value of the backlash occurring area is indicated by Tbls*, according to the offset direction, any value which is 'Tbls*−Tbase+(sign(offset))×A' or more or 'Tbls*−Tbase+(sign(offset))×A' or less is determined as a magnitude of the offset for offset-correcting the value of the vibration torque instruction; and the 'sign(offset)' is a value of '+1' if the offset direction is the driving torque direction, and a value of '−1' if the offset direction is the regenerative torque direction.

17. The method of claim 16, wherein:
if any value which is 'Tbls*−Tbase+(sign(offset))×A' or more is determined as the magnitude of the offset, the offset direction is the driving torque direction; and
if any value which is 'Tbls*−Tbase+(sign(offset))×A' or less is determined as the magnitude of the offset, the offset direction is the regenerative torque direction.

18. The method of claim 14, wherein determining the final motor torque instruction comprises summing the basic motor torque instruction and the corrected vibration torque instruction.

19. The method of claim 14, wherein correcting the vibration torque instruction comprises correcting the determined virtual internal combustion engine vibration characteristic of the vibration torque instruction.

20. The method of claim 19, wherein the virtual internal combustion engine vibration characteristic comprises a vibration frequency and a vibration magnitude (amplitude).

\* \* \* \* \*